(12) United States Patent
Zhang

(10) Patent No.: US 8,145,779 B2
(45) Date of Patent: Mar. 27, 2012

(54) DYNAMIC SERVER-SIDE MEDIA TRANSCODING

(75) Inventor: Geqiang Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 12/099,671

(22) Filed: Apr. 8, 2008

(65) Prior Publication Data

US 2009/0254672 A1    Oct. 8, 2009

(51) Int. Cl.
*G06F 15/16*    (2006.01)
(52) U.S. Cl. ............ 709/231; 709/246; 341/50; 341/51; 725/110
(58) Field of Classification Search .................. 709/231, 709/246; 341/50, 51; 725/110
See application file for complete search history.

(56) References Cited

U.S. PATENT DOCUMENTS

| | | | |
|---|---|---|---|
| 5,996,022 A * | 11/1999 | Krueger et al. | 709/247 |
| 6,345,279 B1 | 2/2002 | Li et al. | |
| 6,363,413 B2 * | 3/2002 | Kidder | 709/203 |
| 6,888,477 B2 * | 5/2005 | Lai et al. | 341/50 |
| 7,133,925 B2 | 11/2006 | Mukherjee et al. | |
| 7,296,295 B2 | 11/2007 | Kellerman et al. | |
| 2004/0010614 A1 * | 1/2004 | Mukherjee et al. | 709/231 |
| 2004/0045030 A1 * | 3/2004 | Reynolds et al. | 725/110 |
| 2004/0093396 A1 * | 5/2004 | Akune | 709/219 |
| 2005/0033855 A1 * | 2/2005 | Moradi et al. | 709/231 |
| 2005/0187690 A1 * | 8/2005 | Williams et al. | 701/51 |
| 2005/0246451 A1 | 11/2005 | Silverman et al. | |
| 2005/0276284 A1 * | 12/2005 | Krause et al. | 370/538 |
| 2006/0026302 A1 * | 2/2006 | Bennett et al. | 709/246 |
| 2006/0168323 A1 | 7/2006 | Kim et al. | |
| 2006/0239574 A1 * | 10/2006 | Brower et al. | 382/240 |
| 2007/0067390 A1 | 3/2007 | Agnoli et al. | |
| 2007/0162487 A1 | 7/2007 | Frailey | |
| 2007/0226365 A1 | 9/2007 | Hildreth et al. | |
| 2007/0233889 A1 | 10/2007 | Guo et al. | |

OTHER PUBLICATIONS

Shin et al; "Hybrid Transcoding for QoS Adaptive Video-on-Demand Services" May 2004, IEEE Transactions on Consumer Electronics, vol. 50 No. 2; pp. 732-736.*
Video Transcoding Gateway for Wireless Video Access (4 pages) http://www.discover.uottawa.ca/publications/CCECE2003_Ryan.pdf.
Adapted Content Delivery for Different Contexts (8 pages) http://ieeexplore.ieee.org/iel5/8426/26546/01183048.pdf?isnumber=26546&prod=Std&arnumber=1183048&arnumber=1183048&arSt=+190&ared=+197&arAuthor=Lemlouma%2C+T.%3B+Layaida%2C+N.
A Scalable Grid-based Multimedia Server (6 pages) http://ieeexplore.ieee.org/iel5/9472/30049/01376856.pdf?isnumber=30049&prod=STD&arnumber=1376856&arnumber=1376856&arSt=+337&ared=+342&arAuthor=Zaia%2C+A.%3B+Bruneo%2C+D.%3B+Puliafito%2C+A.
Content Adaptation and Generation Principles for Heterogeneous Clients (9 pages) http://opera.inrialpes.fr/people/Tayeb.Lemlouma/Papers/Diat-PositionPaper.pdf.

* cited by examiner

*Primary Examiner* — Thomas Dailey
(74) *Attorney, Agent, or Firm* — Workman Nydegger

(57) ABSTRACT

Dynamic transcoding of media content based on transcoding parameters. Upon receiving a request for media content to be delivered to a client, various parameters for transcoding the media content are identified. Such transcoding parameters might be tailored to the particular capabilities of the client presentation system. It not already done, the requested media content may then be transcoded in accordance with the identified parameters. The resulting media stream may then be provided to the client presentation device. In one example, if another request for that same media content is made and the transcoding parameters are identified to be the same, a second media stream may be provided to the second client presentation system.

15 Claims, 3 Drawing Sheets

DYNAMIC SERVER-SIDE MEDIA TRANSCODING

BACKGROUND

Conventionally, media content (such as on-line movies) may be delivered from a media source such as a server computing system, to a media consumer such as a client presentation system or device. There are a wide variety of presentation systems include personal computers, Personal Digital Assistants (PDAs), High-Definition televisions, conventional definition televisions, wide screen displays, and the like. The size of the display and the processing capabilities of the presentation device vary widely. The bandwidth capability of the client presentation device may also vary greatly.

When media contents are encoded and generated, they are typically suitable for one set of client presentation systems, but not others. For example, online movies may play well on Personal Computers (PCs) but not on mobile devices due to the limited bandwidth that mobile devices sometimes have. Furthermore, Personal Computers are typically capable of displaying movies at higher resolution than mobile devices due to the size of the display.

BRIEF SUMMARY

At least some embodiments described herein relate to the dynamic transcoding of media content based on transcoding parameters specified by the client. An example of such media content might be, for example, an on-line video or movie, on-line audio, graphics, or any other media content. Upon receiving a request for media content to be delivered to a client presentation system, various parameters for transcoding the media content are identified. Such transcoding parameters might be tailored to the particular capabilities of the client presentation system. It not already done, the requested media content may then be transcoded in accordance with the identified parameters. The resulting media stream may then be provided to the client presentation device. In one embodiment, if another request for that same media content is made and the transcoding parameters are identified to be the same, a second media stream may be provided to the second client presentation system. Once the transcoding is completed, that transcoded media may be cached in case another request for that media transcoded in that manner is subsequently received.

Accordingly, transcoding may be made to more closely match the capabilities of the client presentation system, and resulting transcoding may be used for future requests for that same media content. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, requested media content (such as videos, pictures, audio, and so forth) may be dynamically transcoded perhaps even after the media content is requested. Upon receiving a request for media content to be delivered to a client presentation system, various parameters for transcoding the media content are identified. Such transcoding parameters might be tailored to the particular capabilities of the client presentation system. If not already done, the requested media content may then be transcoded in accordance with the identified parameters. The resulting media stream may then be provided to the client presentation device. In one embodiment, if another request for that same media content is made and the transcoding parameters are identified to be the same, a second media stream may be provided to the second client presentation system. Once the transcoding is completed, that transcoded media may be cached in case another request for that media transcoded in that manner is subsequently received.

First, some introductory discussion regarding a computing system will be described with respect to FIG. 1. Then, various embodiments of dynamic transcoding will be described with respect to FIGS. 2 and 3.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems. That said, a "message processor" is not even limited to use in a computing system at all.

Figure 1:
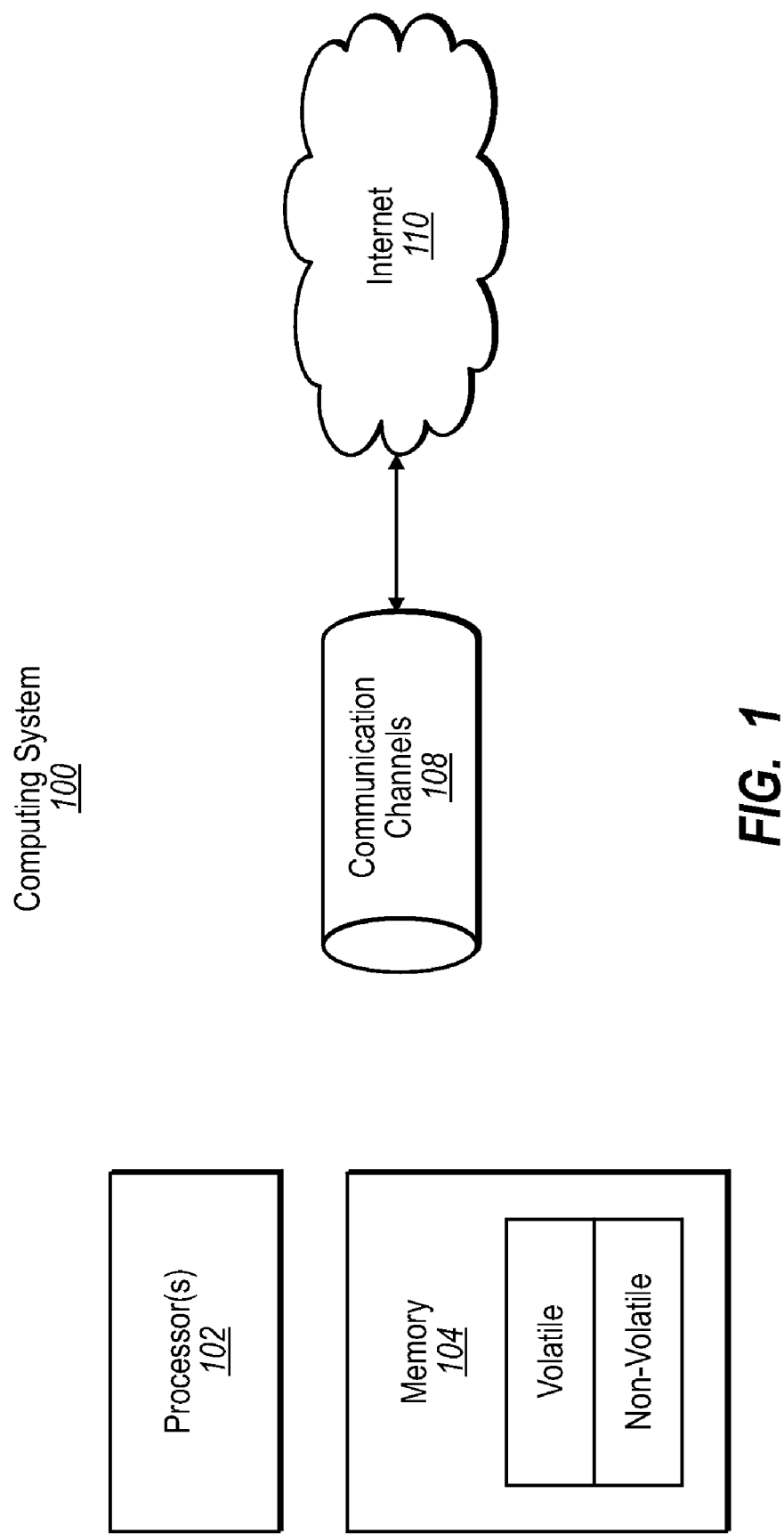
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
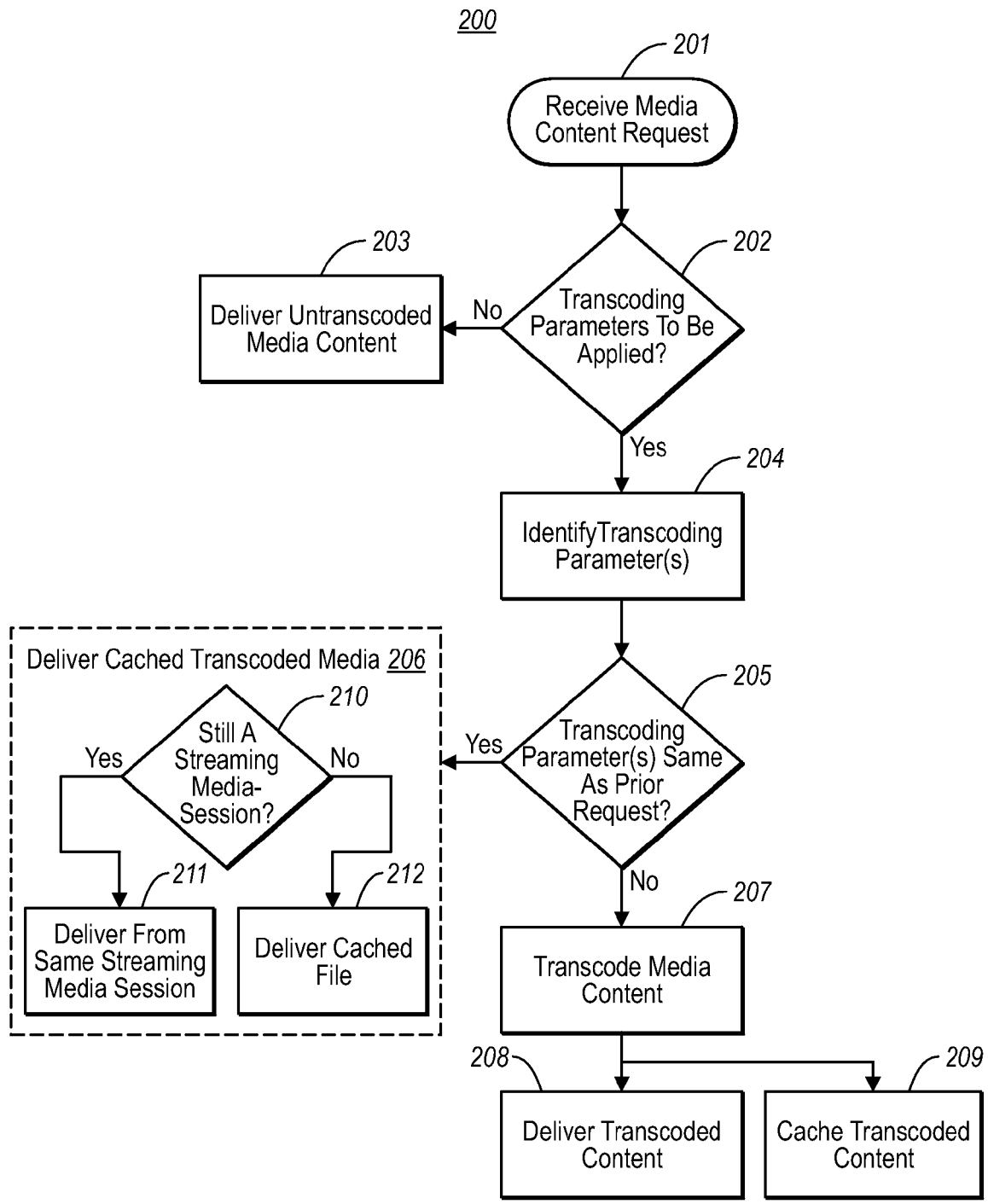
FIG. 2 illustrates a flowchart of a method for dynamically transcoding media content in accordance with one embodiment of the present invention.

FIG. 2 illustrates a flowchart of a method 200 for dynamically transcoding media content to be presented on a client presentation system. The method is initiated upon receiving a request for media content to be delivery to a client presentation system (act 201). The request may be provided from the client presentation system itself, or perhaps from another computing system. In this description and in the claims, a "client presentation system" is any device or system that is capable of receiving and presenting media content. The client presentation system may be, for example, a computing system, but may also be other devices or systems capable of presenting media content. Examples of media content include video, graphics and audio.

Figure 3:
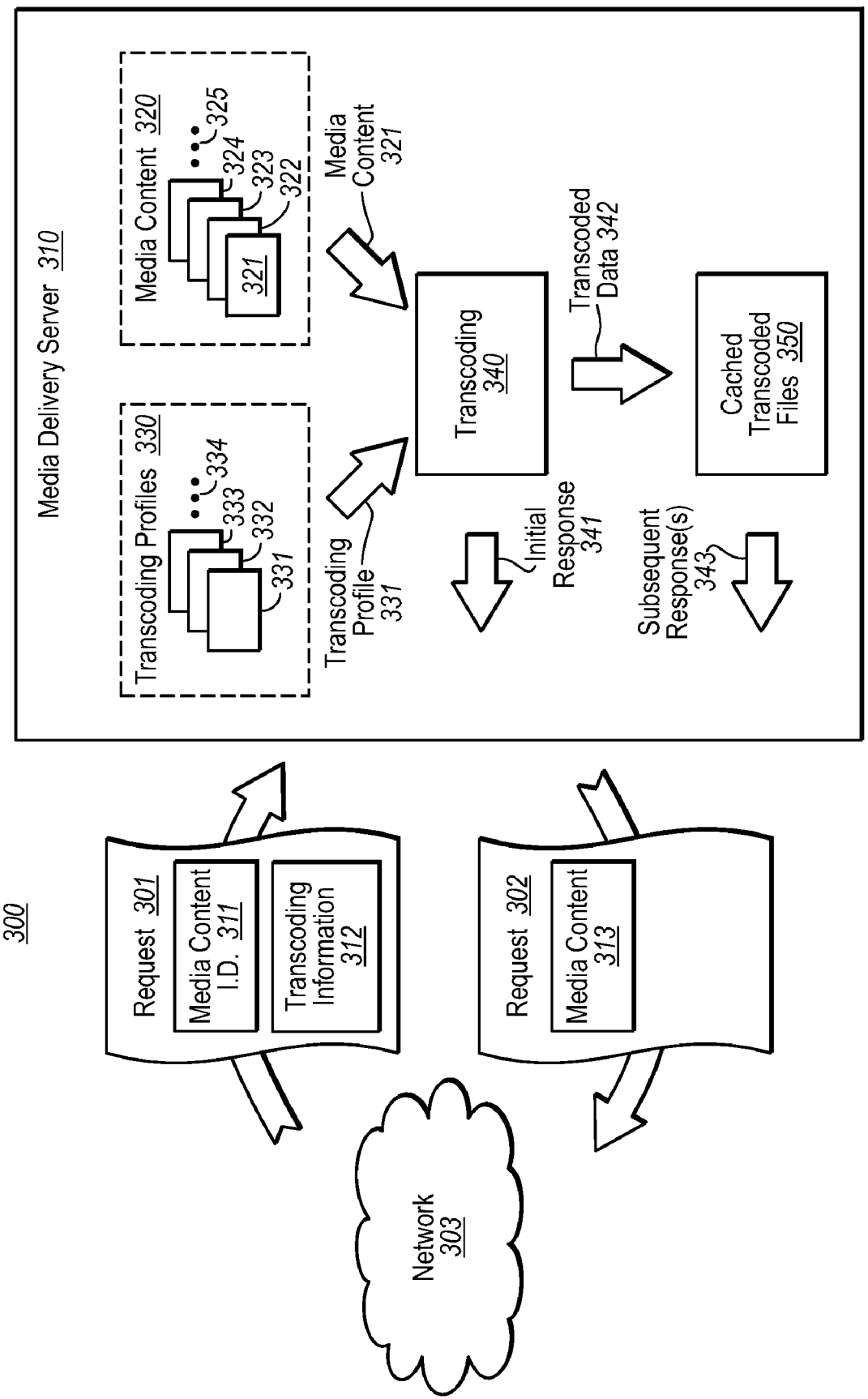
FIG. 3 illustrates an environment in which the transcoding of FIG. 2 may occur.

FIG. 3 illustrates a media content delivery environment 300. The media delivery server 310 receives a request 301 for media content. In one embodiment, the request 301 may be received over a network 303. The network 303 may be any network, but may be, for example, the Internet. The request 301 may include a media content identifier 311 as well as transcoding information 312. Ultimately, a response 302 may be generated that includes the requested media content 313. Depending on the processing at the media delivery server 310, the requested media content 313 may be transcoded.

There may be a wide range of potential client presentation devices, each with perhaps different capabilities and bandwidths. For example, mobile devices might typically have smaller and lower-resolution display devices as compared to a personal computer. A mobile device might also have more limited processing power and bandwidth capabilities as compared to a personal computer. Thus, an on-line movie might be transcoded into a smaller, lower resolution movie if delivered to a mobile device.

Returning to FIG. 2, once the request for media content is received (act 201), the media delivery server 310 determines whether there are one or more transcoding parameters to be applied to the requested content (decision block 202). If there is no transcoding to be performed (No in decision block 202), the requested media content is delivered without transcoding (act 203).

On the other hand, if there is transcoding to be performed (Yes in decision block 202), the one or more transcoding parameters to be applied to the requested media content are identified (act 204). The transcoding parameters may depend on the type of media content. For instance, for on-line video, the transcoding parameters might include the video size, the video sampling rate, the video format, the video resolution, the aspect ratio, and so forth. If the media content were an audio file, the transcoding parameters might include, for example, the sampling rate, whether the content is full theatre mode, stereo mode, or mono-mode, the format of the audio, any audio transformations that are to be applied, and so forth.

In FIG. 3, the transcoding information 312 originally provided in the request may be used to select one of a number of pre-existing transcoding profiles 330. Each transcoding profile may identify one or more transcoding parameters to be applied to the requested media content. In one embodiment, there may be a global set of transcoding profiles. Alternatively, or in addition, the set of transcoding profiles may be specific to a particular media content. For example, a particular movie might have four possible transcoding profiles, while another movie has six possible transcoding profiles.

In the illustrated embodiment, a transcoding profile library 330 is illustrated as including several pre-existing transcoding profiles 331, 332 and 333. The ellipses 334, however, represents that there may be any number of transcoding profiles in the library 330, even perhaps one, two, three, or more than three. The associated transcoding profile 331 identified based on the transcoding information 312 included in the request is then provided to a transcoding module 340. Alternatively, if no transcoding information was provided in the request 301, a default transcoding profile may be provided. In one embodiment, that default transcoding profile may include no transcoding parameters such that no transcoding is performed at all.

Alternatively or in addition, the transcoding parameters may be identified not from a separate transcoding profile, but may be identified within the transcoding information 312 itself. In that case, the transcoding parameter(s) may be identified by simply reading the transcoding parameter(s) from the request itself, and then using those read parameters to perform the transcoding.

Note that the media delivery server also includes a media content library 320. In the illustrated embodiment, the media content library 320 is illustrated as including four items of media content 321, 322, 323 and 324. The ellipses 325 represents that there may be other number of media content. The media content library 320 may be quite large containing many thousands of items of media content. As an example, each item of media content may be an on-line movie, video, or audio. In this case, the media content identifier 311 in the request 301 identified media content 321. Accordingly, media content 321 is provided to the transcoding mechanism 340.

The media delivery server 310 then determines whether or not the transcoding parameters to be applied to the requested media content prior are the same as the transcoding parameters that were applied to the same requested media content in a prior request for that media content (decision block 205). If they are the same (Yes in decision block 205), a cached version of the transcoded media content that had previously been transcoded in accordance with those same transcoding parameters is delivered (act 326). More regarding this option will be explained further below.

For the time being, however, assume that the requested media content had not previously been transcoded using those same transcoding parameters, or at least such a prior transcoded media content had not been cached (No in decision block 205). In that case, the requested media content is transcoded in accordance with the identified transcoding parameters (act 207). In FIG. 3, this is done by transcoding mechanism 340.

In one embodiment, a limited number of base transcoding profiles may exist for a given media content. Each of such a limited number of base transcoding profiles may correspond to a cached version of that media content that has been transcoded in accordance with that base profile. If the identified transcoding parameters can be represented as an incremental additional transcoding on top of the base transcoding, that base transcoded version of the media content may be accessed, and subjected to the additional incremental transcoding.

For example, there might be a base profile called "ABC Wireless Company mobile device profile" which specifies common encoding parameters like bitrates, codecs, sampling rate, and so forth which are common for all handsets issued by ABC Wireless Company. There might then be a base transcoding of a particular item of media content that has been transcoded in accordance with the base profile. Depending on the actual model of the mobile devices, however, the client can dynamically send, for example, the desired video size when requesting the content. In this way, the server can generate the best customized content to the client. Also with proper design of base profile versus properties that can be overwritten, the server can still efficiently manage and reuse the transcoded contents.

Returning to FIG. 2, the transcoded media content is then delivered to the client presentation system (act 208). Referring to FIG. 3, this is represented by the initial response 341, in which case, the media content 313 in the response 302 will be newly transcoded media content. This initial response 341 may perhaps even be streaming media, in which case delivery of the transcoded media content may begin prior to the transcoding session being completed, when the transcoding mechanism 340 is still transcoding the media content.

Additionally, the transcoded media may be cached (act 209). In FIG. 3, for example, the transcoded media data 342 is provided to the cached transcoded files 350. In one embodiment, the transcoded media stream may first be cached while the content is still being transcoded. However, after the content is fully transcoded, the transcoded media may become a transcoded media file. In addition, if transcoding profiles are being used, a transcoding profile may be added to the transcoding profile library 330 for the media content.

As previously mentioned, the transcoding may use a set of transcoding profiles that each specify a set of transcoding parameters. Alternatively, the request itself may specify the transcoding parameters that are to be applied. By allowing the request itself to specify the transcoding profiles, any client can get the best customized transcoding. However, this may result in larger caches since there may be a larger variety of possible transcoding permutations that are performed. That said, it is possible that transcodings might not be cached, especially if it is determined that there will not be enough future demand for that media content transcoded in that way. In addition, perhaps even the smallest difference in the transcoding might cause a new transcoding to begin.

Now suppose one or more subsequent requests for the same media content is received (act 201). Once again, transcoding is to be applied to the requested media content (Yes in decision block 202), the transcoding parameters are identified (act 204). Now, however, the transcoding parameters are the same as the previously transcoded version of the media content (Yes in decision block 205). In that case, the cached transcoded media content is delivered (act 206), rather than having to re-transcode the media content (act 207).

If there is still an active transcoding stream available (Yes in decision block 210), the transcoded stream is provided in response to the second request (act 211). This is represented by subsequent response 343 in FIG. 3. Thus, the transcoded streaming media may be provided to multiple client computing systems concurrently, even though the requests were not received concurrently. For instance, one client presentation device may be receiving the steaming media close to the end of the media, while another is in the middle of the media.

This might happen in a variety of ways. During the initial transcoding session, the server can mark the output media stream as a "broadcast" stream. By doing this, the server can share the cached transcoded stream to other incoming clients before the transcoding is finished. By doing this, the server can make sure that only one transcoding session will exist for one combination of media content and transcoding profile, which can reduce the load on the server. The downside of this design is that the initial clients which started streaming before the fully transcoded file is generated will not be able to do media operations like seek, fast forward, rewind, and so forth, because the steam is marked as broadcast. But once the transcoding session is finished and the full transcoded file is available, all future clients can get full control when playing this file.

A second option is to start a transcoding session for generating the normal transcoded file and attach any client to this session at the beginning. However the server will mark the output stream as a normal on-demand stream so that all operation will be enabled. If any client starts doing media operation that results in content that has not been transcoded, the server starts a new transcoding session for this client. The server can still cache the output for this specific transcoding session and try to reuse it for other client's media operations. With this approach, the initial clients can get all the media operation capabilities but it will incur additional resource cost on the server due to the added transcoding sessions. Thus, one, some, or all of the client presentation systems receiving transcoded media concurrently from the server may potentially all independently perform media operations on the requested media, even while still initially transcoding the media according to a particular transcoding profile.

If, when the second request comes in, there is no longer a transcoding session happening for that set of transcoding parameters (No in decision block 210), then the corresponding cached file may be delivered to the client presentation system (act 212), either as streaming media or as a file. This is also represented by arrow 343 in FIG. 3.

Accordingly, the principles described herein permit a highly dynamic mechanism for transcoding media content. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for causing a computing system to dynamically transcode media content to be presented on a client presentation system, the computer program product comprising:
   one or more computer-readable physical and/or memory storage media, the one or more computer-readable memory media having stored thereon computer-executable instructions that, when executed by one or more processors of the computing system, cause the computing system to perform the following:
   maintaining a transcoding profile library, the transcoding profile library comprising a plurality of transcoding profiles for particular media content;
   an act of receiving a request for media content to be delivered to a client presentation system, wherein the requested media content has an associated untranscoded version of the requested media and a limited number of base transcoding profiles in the transcoding profile library associated therewith, and each base transcoding profile corresponding to a cached version of the requested media content that was previously transcoded;
   an act of determining if transcoding parameters are to be applied to the requested media content, if not, delivering the untranscoded version of the requested media content to the client presentation system;
   if transcoding parameters are to be applied, an act of identifying the transcoding parameters from transcoding information included in the request for media content;
   determining whether an existing base transcoding profile exists within the transcoding profile library corresponds to the identified transcoding parameters and the requested media content;
   if an existing base profile exists, delivering a cached version of the requested media corresponding with the existing base transcoding profile and the requested media content to the client presentation system;
   if an existing base profile does not exist, an act of incrementally transcoding a cached version of the requested media in accordance with the identified transcoding parameters, such that additional incremental transcoding is performed based on multiple of the identified transcoding parameters on top of a base transcoding profile which corresponds to the cached version of the requested media which was previously transcoded according to that respective base transcoding profile;
   an act of delivering the incrementally transcoded cached version of the requested media content to the client presentation system;
   adding a new transcoding profile to the transcoding profile library corresponding to the incrementally transcoded cached version of the requested media; and an act of caching the incrementally transcoded cached version of the requested media content.

2. The computer program product in accordance with claim 1, wherein the act of receiving a request for media content is performed by receiving the request over the Internet.

3. The computer program product in accordance with claim 1, wherein the client presentation system is a first client presentation system, the instructions that, when executed by one or more processors of the computing system, cause the computing system to perform the following further comprising:
   an act of receiving a request for the media content to be delivered to a second client presentation system;
   an act of determining that the transcoding parameters to be applied to the requested media content prior to delivery to the second client presentation system are the same as the transcoding parameters that were applied to the requested media content prior to delivery to the first client presentation system; and
   an act of delivering the previously cached incrementally transcoded media content, rather than separately transcoding the requested media content again for the second client presentation system.

4. The computer program product in accordance with claim 3, wherein the act of caching the incrementally transcoded media content comprises an act of first caching a transcoded stream of the incrementally transcoded media content while the act of transcoding is still occurring, and further caching a transcoded file of the transcoded media content after the act of transcoding has completed.

5. The computer program product in accordance with claim 4, wherein the act of delivery the cached transcoded media content comprises:
   an act of providing the transcoded stream to the second client presentation system.

6. The computer program product in accordance with claim 4, wherein the act of delivery the cached transcoded media content comprises: an act of providing the transcoded file to the second client presentation system.

7. The computer program product in accordance with claim 1, wherein the requested media content is video media.

8. The computer program product in accordance with claim 1, wherein the identified transcoding parameters includes at least video size parameters.

9. The computer program product recited in claim 1, wherein the identified transcoding parameters include a combination of four of more of:
   video size;
   video sampling rate;
   video format;
   video resolution;
   aspect ratio; and
   audio mode.

10. A method for causing a computing system to dynamically transcode media content to be presented on a client presentation system, the method comprising:
    maintaining a transcoding profile library, the transcoding profile library comprising a plurality of transcoding profiles for particular media content;
    an act of receiving a request for media content to be delivered to a client presentation system, wherein the requested media content has an associated untranscoded version of the requested media and a limited number of base transcoding profiles in the transcoding profile library associated therewith, and each base transcoding profile corresponding to a cached version of the requested media content that was previously transcoded;
    an act of determining if transcoding parameters are to be applied to the requested media content, if not, delivering the untranscoded version of the requested media content to the client presentation system;

if transcoding parameters are to be applied, an act of identifying the transcoding parameters from transcoding information included in the request for media content;

determining whether an existing base transcoding profile exists within the transcoding profile library corresponds to the identified transcoding parameters and the requested media content;

if an exitsing base profile exists, delivering a cached version of the requested media corresponding with the existing base transcoding profile and the requested media content to the client presentation system;

if an existing base profile does not exist, an act of incrementally transcoding a cached version of the requested media in accordance with the identified transcoding parameters, such that additional incremental transcoding is performed based on multiple of the identified transcoding parameters on top of a base transcoding profile which corresponds to the cached version of the requested media which was previously transcoded according to that respective base transcoding profile;

an act of delivering the incrementally transcoded cached version of the requested media content to the client presentation system;

adding a new transcoding profile to the transcoding profile library corresponding to the incrementally transcoded cached version of the requested media;

and an act of caching the incrementally transcoded cached version of the requested media content.

11. The method in accordance with claim 10, wherein the requested media content is an on-line video.

12. The method in accordance with claim 11, wherein the client presentation system is a first client presentation system, and the method further comprising:

an act of receiving a request for the media content to be delivered to a second client presentation system;

an act of determining that the transcoding parameters to be applied to the requested media content prior to delivery to the second client presentation system are the same as the transcoding parameters that were applied to the requested media content prior to delivery to the first client presentation system; and an act of delivering the previously cached incrementally transcoded media content, rather than separately transcoding the requested media content again for the second client presentation system.

13. The method in accordance with claim 12, wherein the transcoded media content is provided to both client presentation systems in a manner that both may independently perform media operations on the on-line video.

14. The method in accordance with claim 13, wherein if one of the client presentation systems performs a media operation that causes the on-line movie to exit a currently transcoded region of the on-line video, a new transcoding session for the on-line video is started to support the media operation.

15. The method of claim 10, wherein the identified transcoding parameters include a combination of four of more of:
video size;
video sampling rate;
video format;
video resolution;
aspect ratio; and
audio mode.

* * * * *